United States Patent [19]

Kelley et al.

[11] Patent Number: 4,484,028
[45] Date of Patent: Nov. 20, 1984

[54] DIGITAL LOOP TRANSCEIVER HAVING A POWER UP/DOWN CIRCUIT

[75] Inventors: Stephen H. Kelley, Austin; Henry Wurzburg, Round Rock, both of Tex.

[73] Assignee: Motorola, Inc., Schaumburg, Ill.

[21] Appl. No.: 438,082

[22] Filed: Nov. 1, 1982

[51] Int. Cl.$^3$ ............................................... H04J 3/00
[52] U.S. Cl. .................................... 179/2 DP; 370/29
[58] Field of Search ...................... 179/2 DP, 18 AD; 370/29, 32, 103

[56] References Cited

U.S. PATENT DOCUMENTS

| | | | |
|---|---|---|---|
| 4,051,326 | 9/1977 | Badagnani et al. | 179/2 DP |
| 4,171,467 | 10/1979 | Evenchik | 370/29 X |
| 4,211,895 | 8/1980 | Davis et al. | 179/18 AD X |
| 4,404,672 | 9/1983 | Shimizu | 370/29 |
| 4,415,774 | 11/1983 | Driver | 179/2 DP |

FOREIGN PATENT DOCUMENTS

| | | | |
|---|---|---|---|
| 54-51702 | 4/1979 | Japan | 179/2 DP |
| 57-76962 | 5/1982 | Japan | 179/2 DP |

*Primary Examiner*—Keith E. George
*Attorney, Agent, or Firm*—Anthony J. Sarli, Jr.; Jeffrey Van Myers; Robert L. King

[57] ABSTRACT

In a digital telephone system, a digital private automatic branch exchange (PABX) has a plurality of digital line cards for coupling the PABX to respective digital subscriber sets via subscriber lines. In each digital line card, a digital loop transceiver operates in a master mode to couple the digital data bus of the PABX to the subscriber line via a subscriber line interface circuit in response to control signals provided by the PABX on the control bus thereof. In each digital subscriber set, a digital loop transceiver operates in a slave mode to couple the subscriber set to the subscriber line via a subscriber line interface circuit and to provide the several control signals required by the other components thereof. The digital loop transceivers may provide communication on each of two communication channels, with the digital data words of the first channel being treated the same as the digital data words of the second channel. In each digital loop transceiver, a power up/power down circuit powers down all circuitry associated with each digital loop transceiver except for enough circuitry to detect an incoming data burst. Power up of each digital loop transceiver is accomplished via a power control portion which controls a data transmission controller in response to a detect signal and a power enable signal. A data control portion controls the transmission of bursted data to guarantee the avoidance of data collisions in a two-wire full duplex communication system.

8 Claims, 14 Drawing Figures

DIGITAL LINE CARD

BASIC DIGITAL SUBSCRIBER SET

DIGITAL LOOP TRANSCEIVER HAVING A POWER UP/DOWN CIRCUIT

CROSS REFERENCE TO RELATED APPLICATIONS

Related subject matter may be found in the following applications, each of which is assigned to the assignee hereof;

1. U.S. Pat. No. 4,432,089 entitled "DIGITAL LOOP TRANSCEIVER FOR INTERFACING A DIGITAL PABX TO A DIGITAL SUBSCRIBER SET VIA A SUBSCRIBER LINE", filed Dec. 24, 1981 by Henry Wurzburg and Stephen H. Kelley.

2. Application Ser. No. 416,441, entitled "SIMULTANEOUS VOICE AND DATA TRANSMISSION CIRCUIT HAVING A DIGITAL LOOP TRANSCEIVER", filed Sept. 10, 1982 by Henry Wurzburg.

TECHNICAL FIELD

This invention relates generally to telecommunications systems and, more particularly, to a power control circuit in a digital telephone system comprising a digital PABX and a plurality of digital subscriber sets.

BACKGROUND ART

When a voice call is made using a conventional analog subscriber set, only a small portion of the frequency spectrum available on the typical subscriber line is utilized. During the development of distributed data processing systems, an effort was made to utilize the existing subscriber line network to facilitate communication of the digital data used by such systems. Various types of modulator/demodulator (modem) devices have been developed to take advantage of the latent capability of the subscriber line network to support digital data communication at data rates significantly greater than that required for analog voice communication. For example, synchronous modems are commercially available which utilize the differential phase shift keyed (DPSK) modulation/demodulation technique to provide data communication at rates up to 9600 baud. However, even in the digital private automatic branch exchanges (PABXs) which support intra-exchange communication of voice information in the form of digital PCM voice data words, the response characteristics of the several analog components of the typical analog line card used therein generally prevent reliable communication at higher rates.

Several techniques have been proposed for providing higher speed digital data communication between subscribers through such PABXs. However, such proposals typically require the installation of additional pairs of subscriber lines to subscribers requiring the service and/or redesign/modification of the particular PABX to provide the capability to process the digital data words in a manner different from the digital PCM voice data words. Another problem associated with digital data communication using an existing subscriber line network is excessive power dissipation both at the subscriber set and at the PABX. In a conventional analog phone system, a subscriber set is completely powered down when the set is on hook. When the subscriber set goes off hook for a telephone set origination call, a battery from the central office powers the telephone which acts as a D.C. load. For a central office originated call, a ringing voltage is transmitted via the subscriber line which makes the subscriber phone ring. Only when the subscriber phone goes off hook does the phone draw D.C. power. In a digital PABX, the line card has electronic circuitry instead of only the transformers and relays of a conventional analog system. Others have implemented a digital PABX network with D.C. signalling and high voltage analog ringing signalling so that the components of the electronic circuitry are individually powered up or powered down in response to the telephone in the same manner as in the conventional analog system. In such systems, a subscriber set is passive and is either powered up or down depending upon whether or not the set is off hook. However, when signalling in the form of coded transmissions is used instead of direct current loop signalling or high voltage analog ringing signalling, the electronic circuitry is constantly powered up. Therefore, it is desirable to minimize the power consumption of the digital telephone set when inactive to more closely simulate the analog telephone. Existing digital telephone systems either provide power via a separate pair of subscriber lines or provide no means for reducing power consumption when in an idle state.

SUMMARY OF THE INVENTION

Accordingly, it is an object of the present invention to provide an improved communication system.

Another object of the invention is to provide an improved power up/power down circuit for use in a digital loop communication system utilizing a conventional two-wire subscriber line.

Yet another object of the invention is to provide a power control circuit utilizing a digital loop transceiver (DLT) and two-wire subscriber line with improved data collision avoidance.

In carrying out the above and other objects of the present invention, there is provided, in one form, a power up/power down circuit for use in a communication system comprising a digital transceiver in a PABX and a digital transceiver in a subscriber set coupled via a subscriber line. Transmissions may be made or received at either the subscriber set or PABX. Control means at both the subscriber set and PABX power down all circuitry associated with the digital transceiver except activity detection means in both the subscriber set and PABX when the system is in an idle mode. Activity detection means allow either the subscriber set or PABX circuitry to power up in response to a data transmission from either. A power up/power down protocol is used to allow the control means to power down the PABX transceiver and the subscriber set and avoid both data collision in a two-wire system and accidental power up.

The above and other objects, features and advantages of the present invention will be more clearly understood from the following detailed description taken in conjunction with the accompanying drawings.

DESCRIPTION OF THE PREFERRED EMBODIMENT

Figure 1:
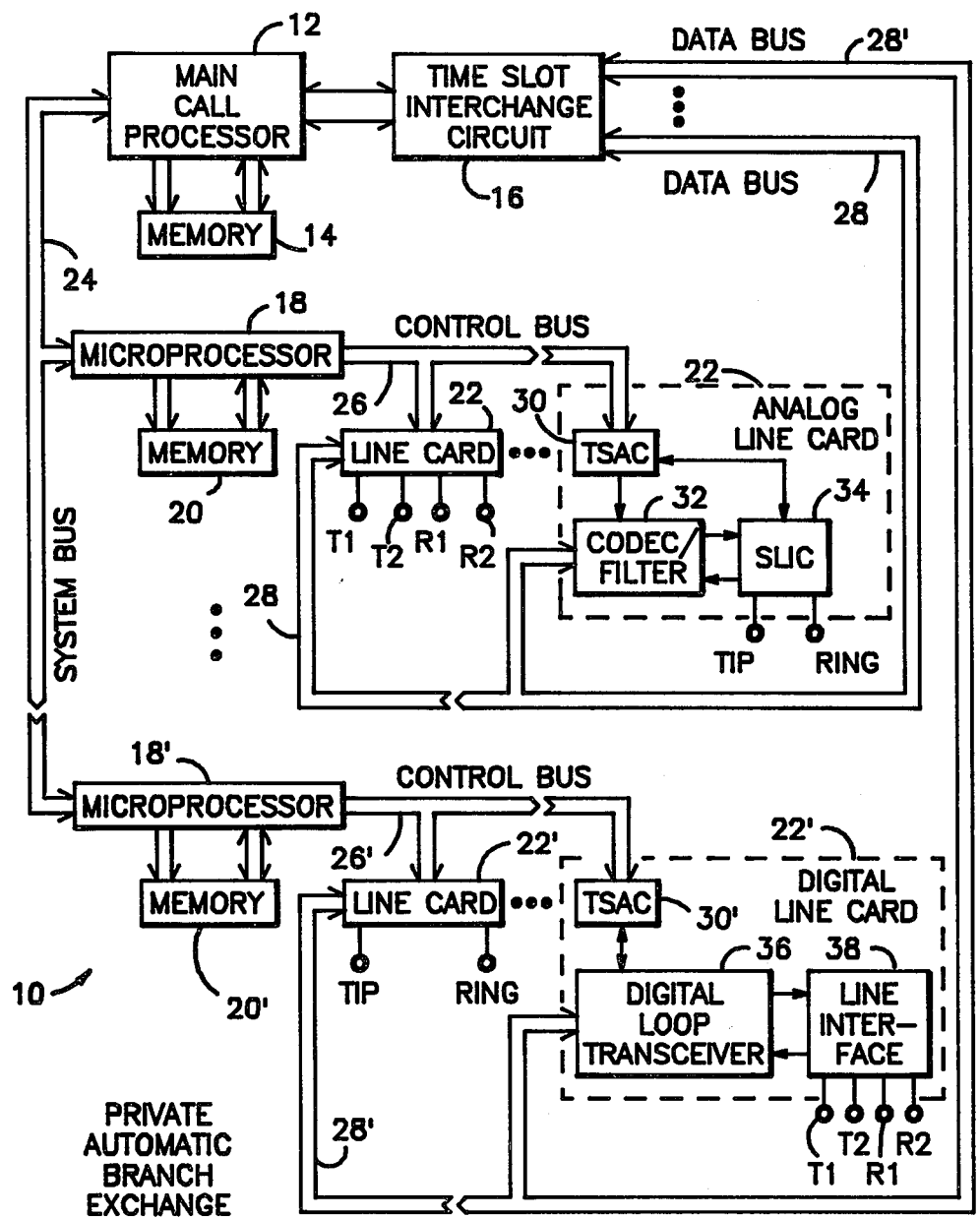
FIG. 1 is a block representation of a private automatic branch exchange (PABX).

Shown in FIG. 1 is a conventional private automatic branch exchange (PABX) 10 comprised generally of a main call processor 12 having associated memory 14, a time slot interchange circuit 16, a set of call processing microprocessors 18—18', each having an associated memory 20—20', and a plurality of conventional analog line cards 22. In the illustrated form, PABX 10 also includes at least two digital line cards 22' constructed in accordance with the present invention.

In a typical digital telephone switching system such as PABX 10, main call processor 12 coordinates, via a system bus 24, the call processing activities of each of the several call processing microprocessors 18—18'. In turn, each of the call processing microprocessors 18—18' controls, via respective control buses 26—26', the communication of digital PCM voice data words via respective data buses 28—28' between the several line cards 22 assigned to such microprocessor 18—18'.

Figure 2:
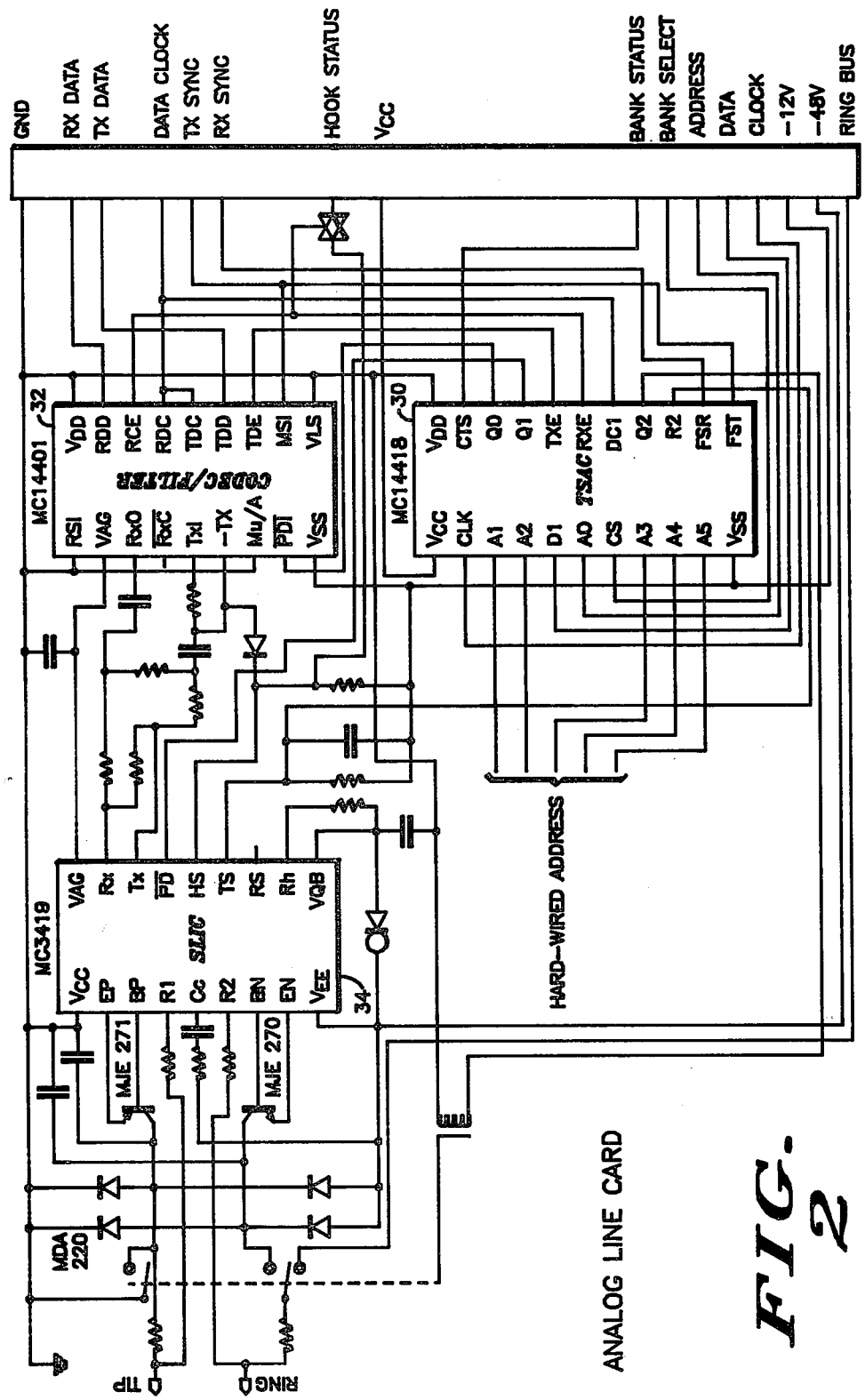
FIG. 2 is a schematic diagram of an analog line card for use in the PABX of FIG. 1.

In general, each of the analog line cards 22 comprises a time slot assignment and control circuit (TSAC) 30 for selectively enabling a codec/filter 32 to digitally encode an analog voice input signal received via a subscriber line interface circuit (SLIC) 34 from a conventional single channel subscriber set (not shown) coupled to tip and ring conductors for output as a digital pulse code modulation (PCM) voice data word on the respective data bus 28—28', and to decode a digital PCM voice data word received on data bus 28—28' for output as an analog voice output signal to the subscriber set (not shown) via SLIC 34. Shown in FIG. 2 is a circuit schematic for such a conventional analog line card 22, using components commercially available from Motorola. The various control and data signals which are provided to or by line card 22 are generally referred to as the "backplane" of PABX 10.

In a typical telephone call initiated by a subscriber served by a "source" line card 22 controlled by, say, call processing microprocessor 18 to a subscriber served by a "destination" line card 22' controlled by, for example, call processing microprocessor 18', TSAC 30 on source line card 22 initially detects via associated SLIC 34 that the source subscriber set is off hook, and routes call routing information to call processing microprocessor 18 for transfer to main call processor 12. If destination line card 22 is not indicated in memory 14 as being busy, main call processor 12 then requests call processing microprocessor 18' to notify destination line card 22 of the call. If, upon providing the system-generated ring signal to the destination subscriber set via the respective SLIC 34, associated TSAC 30 advises call processor 18' that the destination subscriber set has been taken off hook, call processing microprocessor 18' advises main call processor 12 that the requested connection has been established. During a particular transmit time slot assigned by main call processor 12, TSAC 30 on source line card 22 enables associated codec/filter 32 to encode the analog voice signal then being received from the source subscriber set via SLIC 34 for output as a digital PCM voice data word onto data bus 28. Meanwhile, main call processor 12 has enabled time slot interchange circuit 16 to couple data bus 28 to data bus 28' to facilitate the requested intra-exchange communication of the digital PCM voice data word. Simultaneously, TSAC 30 on destination line card 22 enables associated codec/filter 32 to decode the digital PCM voice data word on data bus 28 for output as an analog voice signal to the destination subscriber set via SLIC 34. In a similar manner, but during a different receive time slot assigned by main call processor 12, destination line card 22 is allowed to encode the analog voice signal received from the destination subscriber set for transmission as a digital PCM voice data word via data bus 28', interchange circuit 16 and data bus 28' to source line card 22 for decoding and output to the source subscriber set. If this exchange of digital PCM voice data words occurs at a sufficiently high frame rate, say of the order of 8 kHz, then it will appear to each of the subscribers that there is a direct analog link between their respective subscriber sets.

Figure 3:
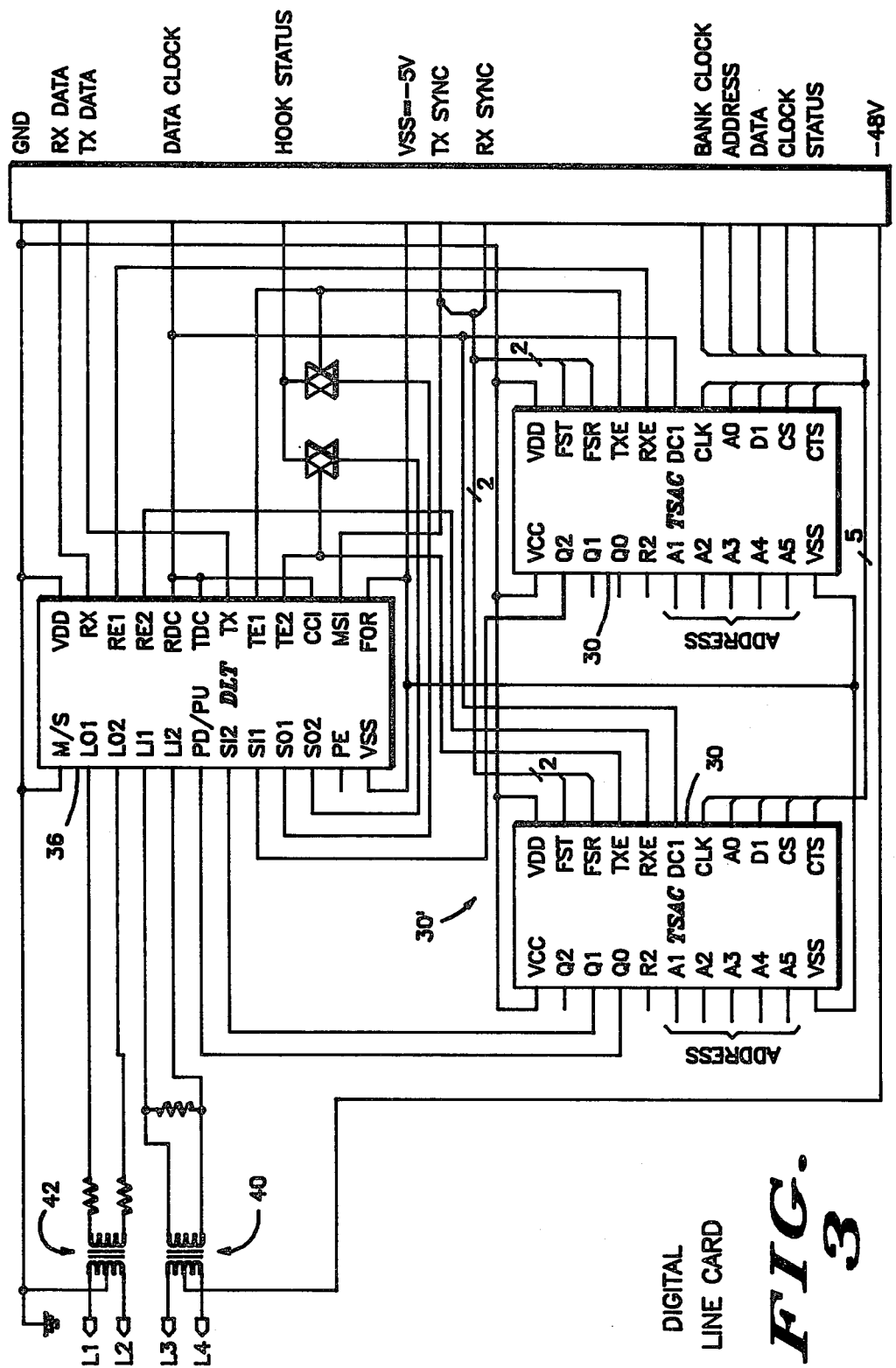
FIG. 3 is a digital line card for use in the PABX of FIG. 1.
Figure 4:
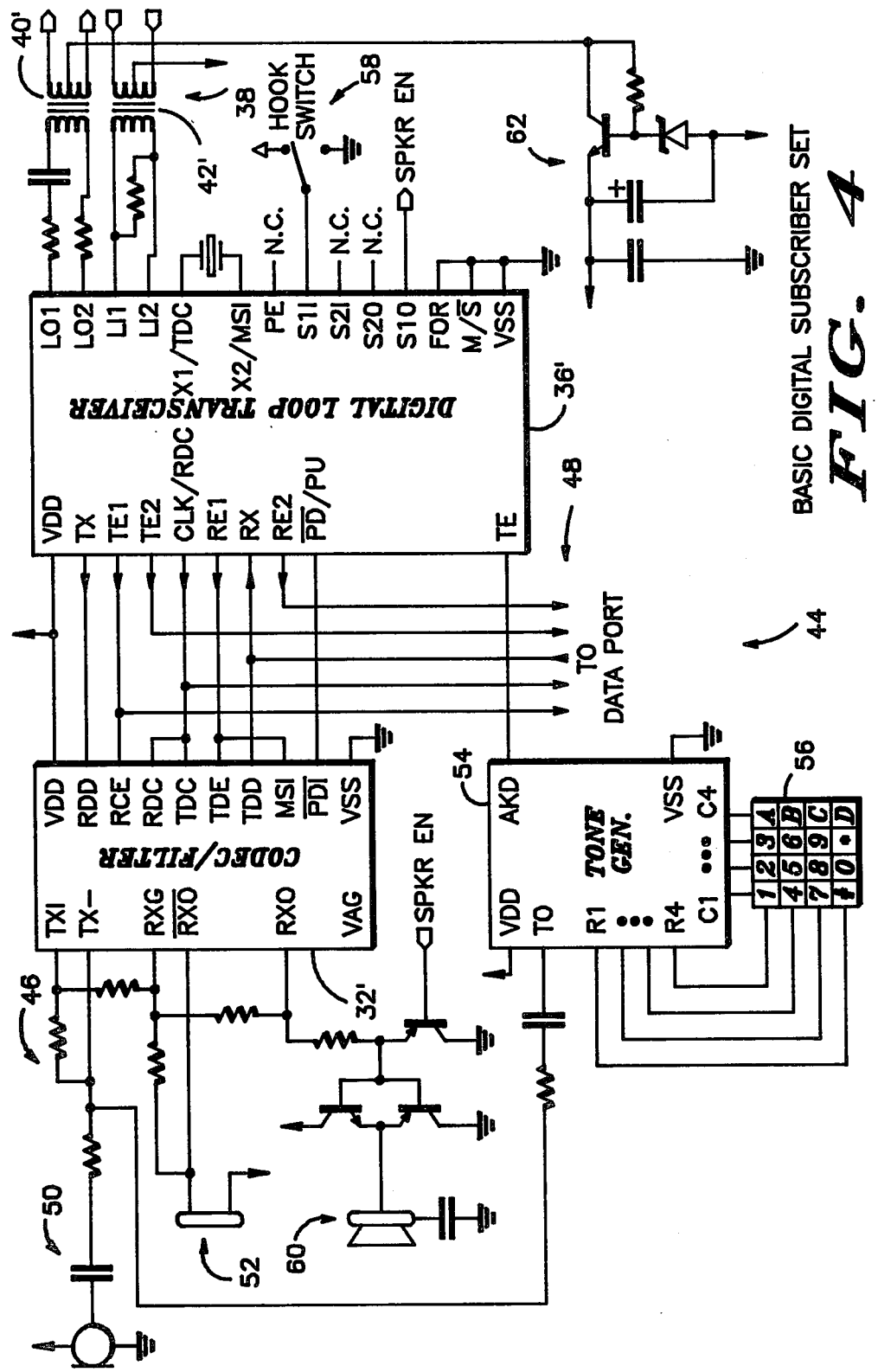
FIG. 4 is a digital subscriber set to communicate over a subscriber line with the digital line card of FIG. 3.

In the general form shown in FIG. 1, each of the digital line cards 22' comprises a time slot assignment and control circuit (TSAC) 30' for selectively enabling a digital loop tranceiver (DLT) 36 (see FIG. 5) to receive digital data words via a subscriber line interface network 38 from a dual channel, digital subscriber set, such as that shown in FIG. 4, which is coupled to respective receive and transmit pairs of tip and ring conductors, for direct output on the respective data bus 28—28' in the same manner as the digital PCM voice data words are output by the codec/filter 32 in analog line cards 22; and to receive digital data words on data bus 28—28' for direct output to the subscriber set via subscriber line interface network 38. Shown in FIG. 3 is a circuit schematic for the digital line card 22', wherein: TSAC 30' comprises a pair of Motorola time slot assignment circuits (TSACs 30), one for each of two digital communication channels digital line card 22' is capable of simultaneously supporting; DLT 36 comprises an integrated circuit constructed in accordance with FIG. 5; and subscriber line interface network 38 comprises a transmit isolation transformer 40 coupled to the tip and ring conductors which comprise the receive pair of the subscriber line and a receive isolation transformer 42 coupled to the tip and ring conductors which comprise the transmit pair of the subscriber line. As illustrated in FIG. 3, digital line card 22' responds to and provides the same control and data signals which are provided to or by analog line card 22 via the backplane of PABX 10.

Shown in FIG. 4 is a dual channel, digital subscriber set 44. In general, subscriber set 44 comprises a digital loop transceiver (DLT) 36' (see FIG. 5) for receiving digital data words from digital line card 22' (see FIG. 3) via a subscriber line interface network 38' coupled to respective receive and transmit pairs of tip and ring conductors, for output, if digital PCM voice data words, to a conventional codec/filter 32' for subsequent decoding and output as an analog voice output via a voice I/O network 46, or, if digital data words, to a subscriber data processor (not shown) via a data port 48; and for transmitting digital data words provided either by codec/filter 32' in the form of digital PCM voice data words or by the subscriber data processor in the form of digital data words, to digital line card 22' via subscriber line interface network 38'. In the preferred form, voice I/O network 46 includes a voice input portion 50, and a voice output portion 52; DLT 36' comprises an integrated circuit constructed in accordance with FIG. 5; and subscriber line interface network 38' comprises a transmit isolation transformer 40' coupled to the tip and ring conductors which comprise the transmit pair of the subscriber line and a receive isolation transformer 42' coupled to the tip and ring conductors which comprise the receive pair of the subscriber line. In the illustrated form, a conventional tone generator 54, such as the Mostek MK5087, interacts with a dial keypad 56 and voice I/O network 46 to provide call routing information required to establish each of two communication channels, while a conventional hook switch 58 provides call initiation signalling information to DLT 36'. An audible indication of an incoming call is provided via a ringing transducer 60. A subscriber set power supply 62 derives operating power for the several components of subscriber set 44 from the subscriber line in a conventional manner.

Figure 5:
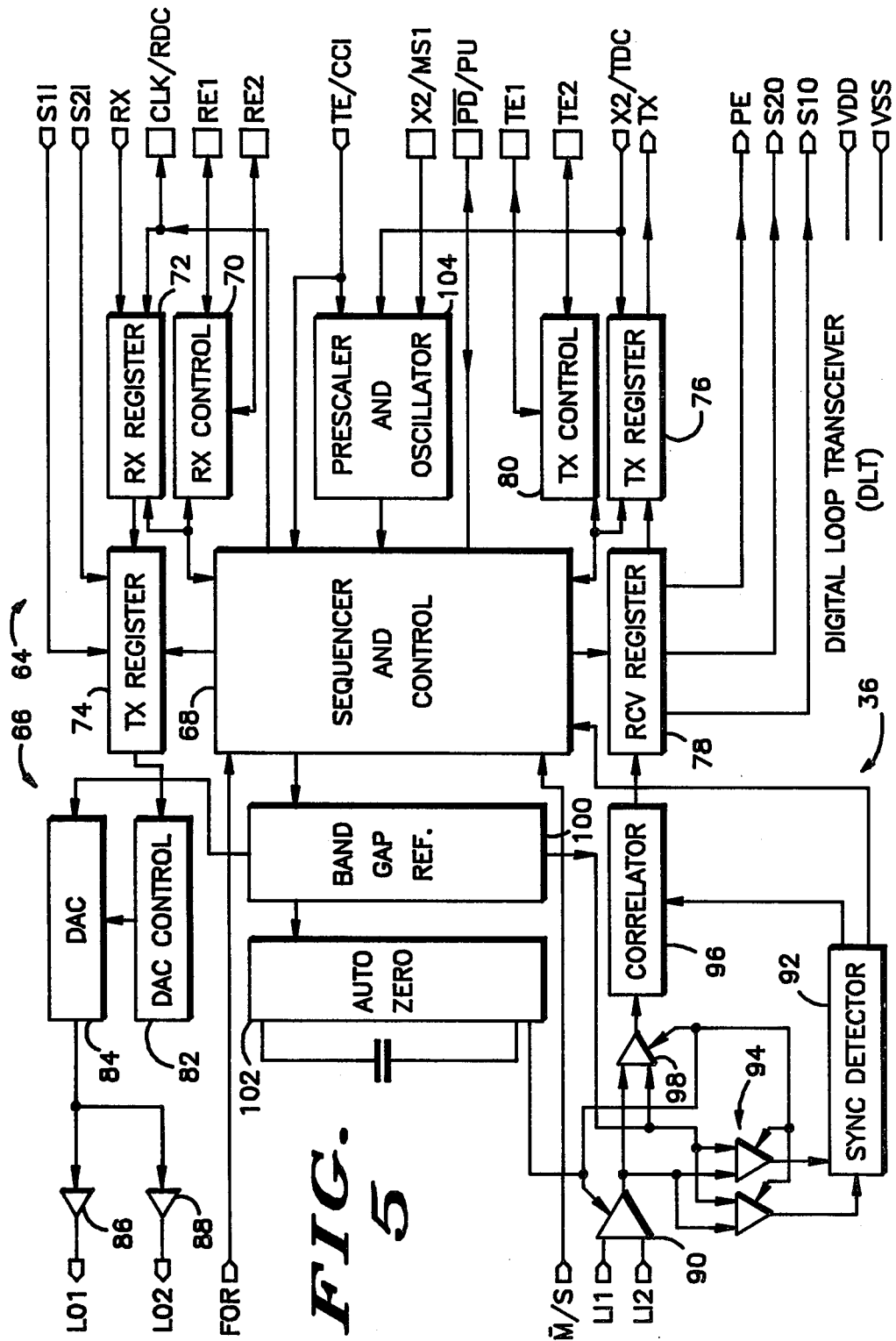
FIG. 5 is a digital loop transceiver (DLT) for use in the digital line card of FIG. 3 and the digital subscriber set of FIG. 4.

Shown in FIG. 5 is a block diagram of digital loop transceiver (DLT) 36. In general, DLT 36 comprises a digital interface portion 64 for interfacing with PABX 10 in a master operating mode and with codec/filter 32 and subscriber data processor in a slave operating mode, a modulator/demodulator portion 66 for transmitting and receiving digital data words via the subscriber line, and a sequencer and control portion 68 for controlling the sequence of operations performed by digital interface and modulator/demodulator portions 64 and 66, respectively.

In digital interface portion 64, a receive (RX) control circuit 70 responds to either of two channel receive enable signals, RE1 and RE2, by enabling a receive (RX) register 72 of the shift register type to serially receive digital data bits via a receive (RX) terminal in synchronization with a receive data clock (RDC) on a CLK/RDC terminal. When a predetermined "frame" of data (see discussion below) has been received, sequencer and control portion 68 enables RX register 72 to transfer the "transmit" frame of data in parallel into a transmitter (XMIT) register 74 in modulator/demodulator portion 66. Simultaneously, the then-current states of the two channel signalling bits on respective S1I and S2I terminals are latched and inserted into the frame of data in XMIT register 74. Substantially independently, sequencer and control portion 68 enables a transmit (TX) register 76 to receive a "receive" frame of data in parallel from a receiver (RCV) register 78 in modulator/demodulator portion 66. Simultaneously, the two channel signalling bits in the receive frame of data are latched and outputted on respective S1O and S2O terminals. In response to either of two channel transmit enable signals, TE1 and TE2, a transmit (TX) control circuit 80 enables TX register 76 to serially transmit the receive frame of data via a TX terminal in synchronization with a transmit data clock (TDC) on an X2/TDC terminal.

In modulator/demodulator portion 66, a digital to analog converter (DAC) control circuit 82 periodically enables a digital to analog converter (DAC) 84 to transmit the transmit frame of data in the XMIT register 74 to transmit transformer 40 in subscriber line interface network 38 using a differential pair of output drivers 86 and 88 coupled to respective line output terminals LO1 and LO2. In a preferred form, DAC 84 utilizes a burst differential phase shift keyed (DPSK) modulation technique at a carrier frequency of 256 kHz. Substantially independently, an input buffer 90 of the differential to single ended output type in modulation/demodulation portion 66 couples the signal received from receive transformer 42 in subscriber line interface network 38 via line input terminals LI1 and LI2 to a sync detector 92 via a window detector 94 and to a correlator 96 via a comparator 98. As phase shifts of the proper form are decoded by correlator 96, the "decoded" bits are shifted into a shift register portion thereof which maintains the most recently received set of data bits which might constitute a frame. When the energy of a DPSK signal of the proper frame length is detected, sync detector 92 provides a valid sync signal to enable correlator 96 to transfer the receive frame of data bits being maintained therein, in parallel to RCV register 78. A demodulator having a sync detector and correlator of suitable form is shown and described in copending U.S. patent application Ser. No. 332,408. A switched capacitor bandgap reference 100 similar to that shown and described in copending U.S. patent application Ser. No. 231,073, now U.S. Pat. No. 4,375,595, provides a precision reference voltage to DAC 84, window detector 94, and comparator 98. Periodically, the offsets of input buffer 90, window detector 94, comparator 98, and bandgap reference 100 are zeroed by an auto-zero circuit 102 in a manner similar to that shown and described in U.S. Pat. No. 4,355,285.

In operation, DLT 36 provides duplex communication of digital data words on a pair of independent channels and a signalling bit associated with each of the channels, between the duplex subscriber line and a digital data port. In a typical line transmission operation, RX register 72 successively receives a digital data word for each of the channels in synchronization with the receive data clock, with the digital data word for the first of the channels being received from the digital I/O port via the RX terminal in response to the first of the channel receive enable signals, RE1, and the digital data word for the second of the channels being received from the digital I/O port via the RX terminal in response to the second of the channel receive enable signals, RE2. After the last data bit of the frame has been clocked into RX register 72, both data words are transferred to XMIT register 74, and the then-current states of the respective channel signalling bits on the S1I and S2I terminals added to complete the frame. As soon as the frame has been assembled, DAC control circuit 82 actuates DAC 84 to serially modulate the first and second digital data words and the respective channel signalling bits in the frame, for transmission via transmit transformer 40 to one of the pairs of wires in the subscriber line.

In a typical line reception operation, sync detector 92 monitors the signal received via receive transformer 42 on the other pair of wires in the subscriber line, and provides a valid sync signal in response to detecting the energy of a DPSK modulated signal of the proper frame length. Meanwhile, correlator 96 has been serially demodulating the sequentially received bits which might constitute a frame containing a digital data word for each of the channels and the respective channel signalling bits. In response to the valid sync signal, indicating that a valid frame has indeed been received, correlator 96 transfers the frame to RCVR register 78. At an appropriate time depending upon the mode of operation, the frame is then transferred from RCVR register 78 to TX register 76 and the respective channel signalling bits latched for output on the S10 and S20 terminals. The TX register 76 then sequentially transmits the digital data words in synchronization with the transmit data clock, with the digital data word for the first channel being transmitted to the digital I/O port via the TX terminal in response to the first of the channel transmit enable signals, TE1, and the digital data word for the second channel being transmitted to the digital I/O port via the TX terminal in response to the second of the channel transmit enable signals, TE2.

Figure 6:
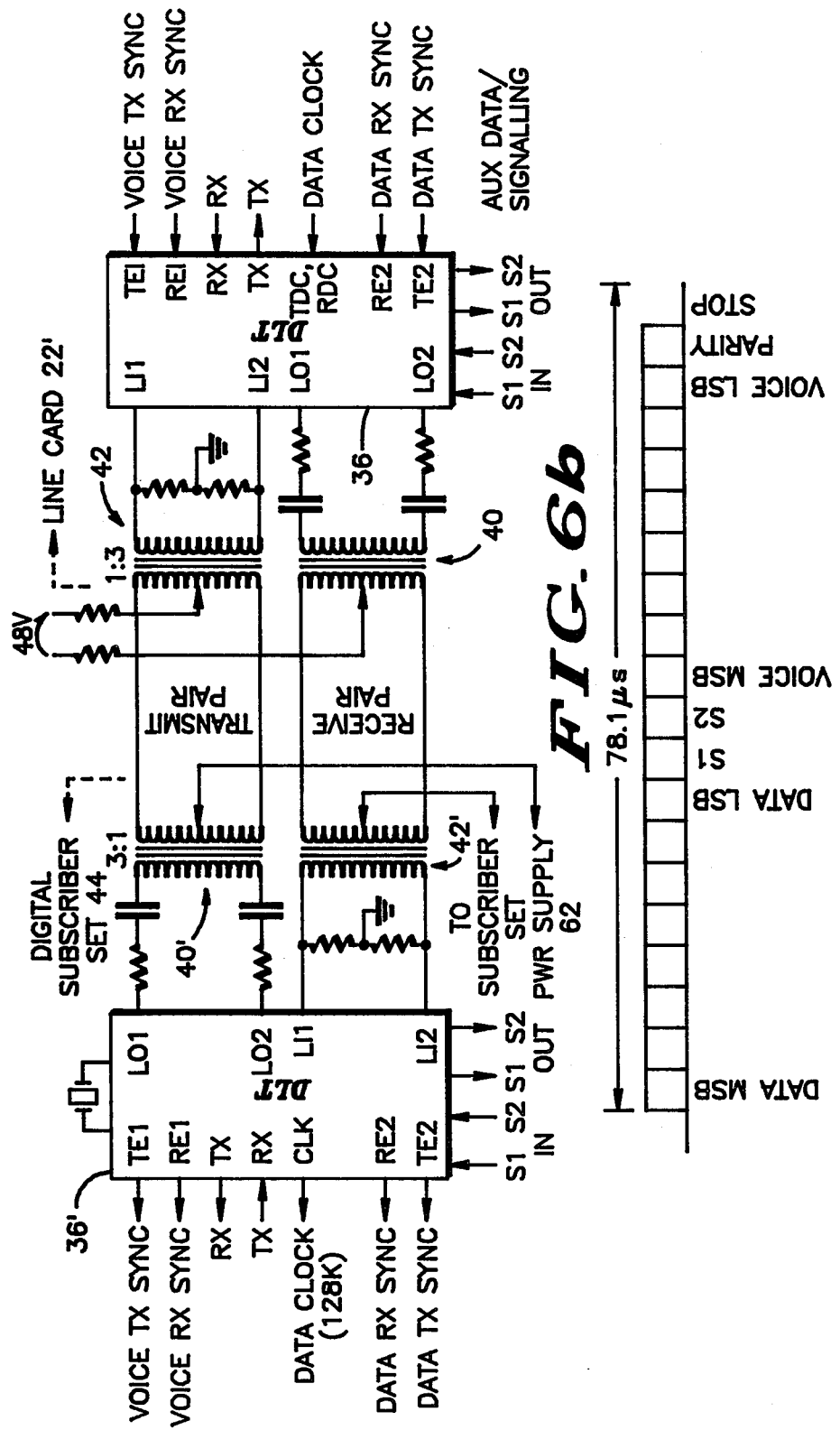
FIG. 6(a) is a schematic representation of a four-wire communication system between the DLT in the digital line card of FIG. 3 and the DLT in the digital subscriber set of FIG. 4.
FIG. 6(b) is a diagram of a data word associated with the communication system of FIG. 6(a).

Shown in FIG. 6 is a schematic representation of a four-wire or duplex subscriber line which has been coupled at the exchange end thereof to DLT 36 in digital line card 22' via transmit and receive transformers 40 and 42, respectively, and at the subscriber end thereof to DLT 36' in digital subscriber set 44 via transmit and receive transformers 40' and 42', respectively. In the dual-channel form of the duplex system, a frame of data comprises an eight bit digital data word for the first channel, an eight bit digital data word for the second channel, and the signalling bits for the first and second channels. Preferably, the frame also includes a parity bit, either even or odd, as desired. A suitable frame format is illustrated in FIG. 6.

In digital line card 22' (FIG. 1), DLT 36 which is illustrated in greater detail in FIG. 5 is placed in the master mode of operation by a logic high signal on a master/slave ($\overline{M}/S$) terminal. In the master mode, DLT 36 emulates codec/filter 32 (FIG. 1) with respect to the backplane by receiving/transmitting the digital data words just like codec/filter 32, and by responding to the various control signals just like codec/filter 32. In particular, RX register 72 of FIG. 5 successively receives a digital data word for each of the channels in synchronization with the data clock provided by PABX 10 via the backplane, with the data word for the first channel being received from the backplane via the RX terminal in response to the RE1 signal provided by a respective one of the TSACs 30 during the receive time slot assigned to the first channel, and the data word for the second channel being received from the backplane via the RX terminal in response to the RE2 signal provided by the other TSAC 30 during the receive time slot assigned to the second channel. In response to the next master sync input (MSI) received via an X2/MSI terminal after the last data bit of the frame has been clocked into RX register 72, both digital data words are transferred to XMIT register 74, and the then-current states of the respective channel signalling bits provided via the S1I and S2I terminals by TSACs 30, respectively, added to complete the frame. As soon as the frame has been assembled, DAC control circuit 82 actuates DAC 84 to serially modulate the first and second digital data words and the respective channel signalling bits in the frame, for transmission via transmit transformer 40 to the receive pair of wires in the subscriber line.

Figure 7:
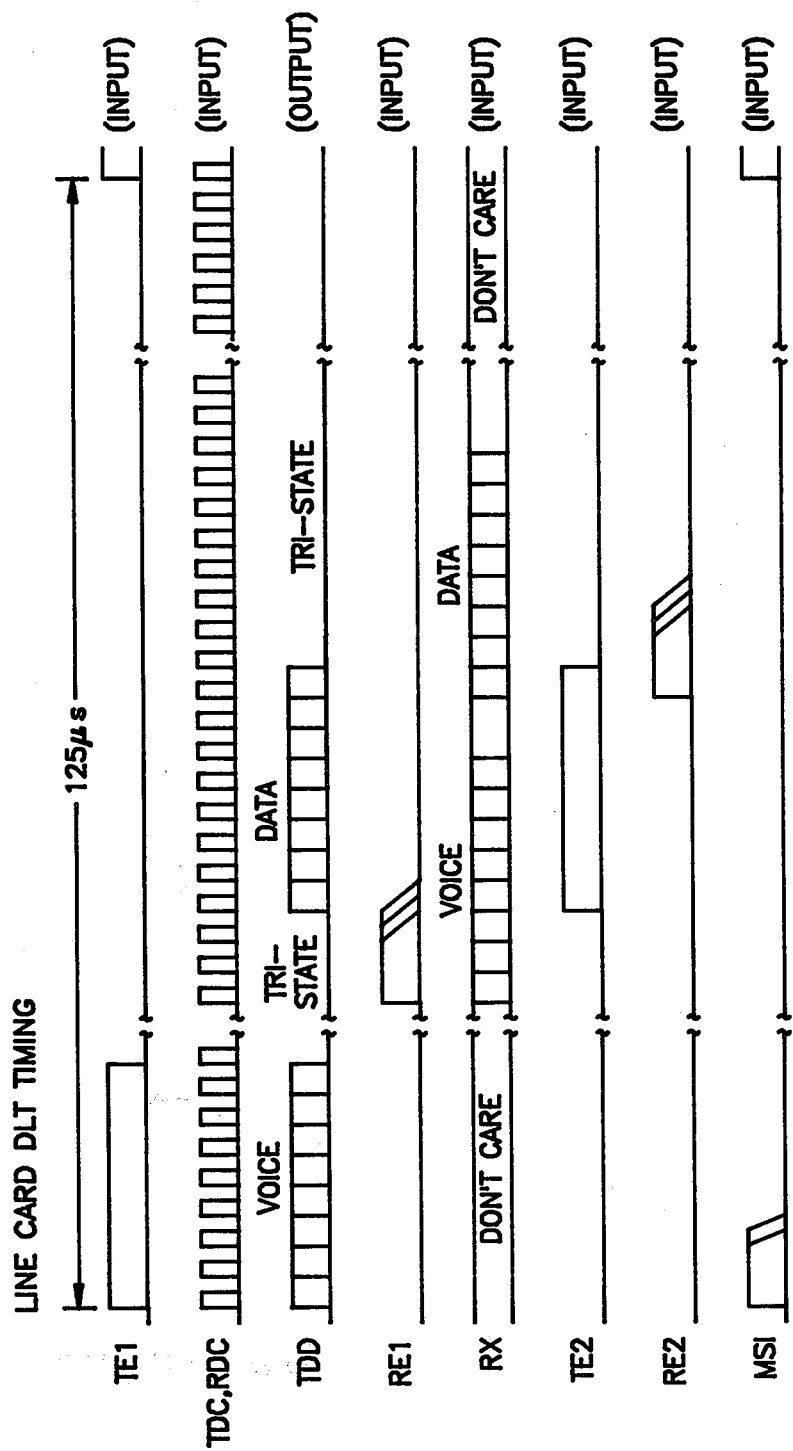
FIG. 7 is a timing diagram illustrating a typical exchange between the DLT in the digital line card of FIG. 3 and the PABX of FIG. 1.

Simultaneously, sync detector 92 monitors the signal received via receive transformer 42 on the transmit pair of wires in the subscriber line, and provides the valid sync signal in response to detecting the energy of a DPSK modulated signal of the proper frame length. Meanwhile, correlator 96 has been serially demodulating the sequentially received bits which might constitute a frame containing a digital data word for each of the channels and the respective channel signalling bits. In response to the valid sync signal, indicating that a valid frame has indeed been received, correlator 96 transfers the frame to RCVR register 78. In response to the next MSI, the frame is then transferred from RCVR register 78 to TX register 76 and the respective channel signalling bits latched for output on the S10 and S20 terminals. The TX register 76 then sequentially transmits the digital data words in synchronization with the transmit data clock provided by PABX 10 via the backplane, with the digital data word for the first channel being transmitted to the backplane via the TX terminal in response to the TE1 signal provided by the first one of TSACs 30 during the transmit time slot assigned to the first channel, and the digital data word for the second data channel being transmitted to the backplane via the TX terminal in response to the TE2 signal provided by the other TSAC 30 during the transmit time slot assigned to the second channel. A typical sequential interaction of DLT 36 with TSACs 30, and with PABX 10 is illustrated by way of example in the timing diagram of FIG. 7.

In subscriber set 44 shown in FIG. 4, DLT 36' (shown in greater detail as DLT 36 in FIG. 5) is placed in the slave mode of operation by a logic low on the master/slave ($\overline{M}/S$) terminal. In the slave mode, DLT 36' emulates the functions of TSAC 30 and the backplane with respect to codec/filter 32' by providing the digital PCM voice data words and control signals necessary for codec/filter 32' to operate, and by receiving the digital PCM voice data words provided by codec/filter 32' just like the backplane. In this mode, sync detector 92 monitors the signal received via receive transformer 42' on the receive pair of wires in the subscriber line, and provides the valid sync signal in response to detecting the energy of a DPSK modulated signal of the proper frame length. Meanwhile, correlator 96 has been serially demodulating the sequentially received bits which might constitute a frame containing a digital data word for each of the channels and the respective channel signalling bits. In response to the valid sync signal, indicating that a valid frame has indeed been received, correlator 96 transfers the frame to RCVR register 78. The frame is then promptly transferred from RCVR register 78 to TX register 76 and the respective channel signalling bits latched for output on the S10 and S20 terminals. The TX register 76 then sequentially transmits the digital data words in synchronization with a transmit data clock generated by a prescaler and oscillator 104 using a crystal coupled between the X1/TDC and X2/MSI terminals, with the digital data word for the first channel being transmitted to codec/filter 32' via the TX terminal in synchronization with a TE1 signal generated by TX control 80 relative to the last valid sync signal, and the digital data word for the second data channel being transmitted to data port 48 via the TX terminal in synchronization with a TE2 signal generated by TX control 80 relative to the last valid sync signal.

Figure 8:
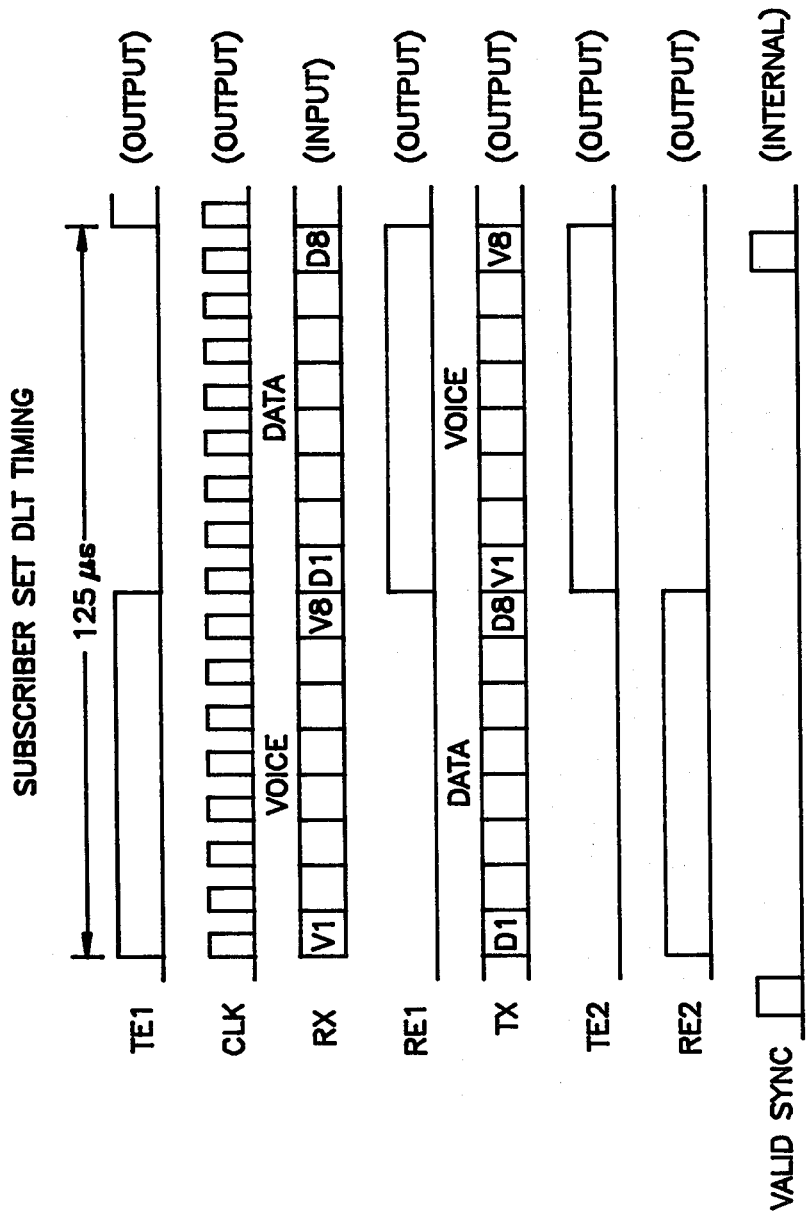
FIG. 8 is a timing diagram illustrating a typical exchange between the DLT in the subscriber set of FIG. 4 and the codec/filter therein.

In response to each of the valid sync signals provided by sync detector 92, RX register 72 successively receives a digital data word for each of the channels in synchronization with a receive data clock generated by sequencer and control 68, with the digital PCM voice data word for the first channel being received from codec/filter 32' via the RX terminal in synchronization with an RE1 signal generated by RX control 70 relative to the last valid sync signal, and the digital data word for the second channel being received from data port 48 via the RX terminal in response to an RE2 signal generated by RX control 70 relative to the last valid sync signal. In response to the next valid sync signal provided by sync detector 92, both digital data words are transferred to XMIT register 74 and the then-current states of the respective channel signalling bits provided via the S1I and S2I terminals by hook switch 58 and, if appropriate, the subscriber data processor, respectively, are added to complete the frame. As soon as the frame has been assembled, DAC control circuit 82 actuates DAC 84 to serially modulate the first and second digital data words and the respective channel signalling bits in the frame, for transmission via transmit transformer 40' to the transmit pair of wires in the subscriber line. A typical sequential interaction of DLT 36' with codec/filter 32' and the subscriber data processor is illustrated by way of example in the timing diagram of FIG. 8.

The prior detailed description has pertained to a communication system operating in a dual-channel mode having two pairs of wires in each subscriber line. A conventional PABX architecture has also been assumed to be used with the DLT disclosed.

Figure 9:
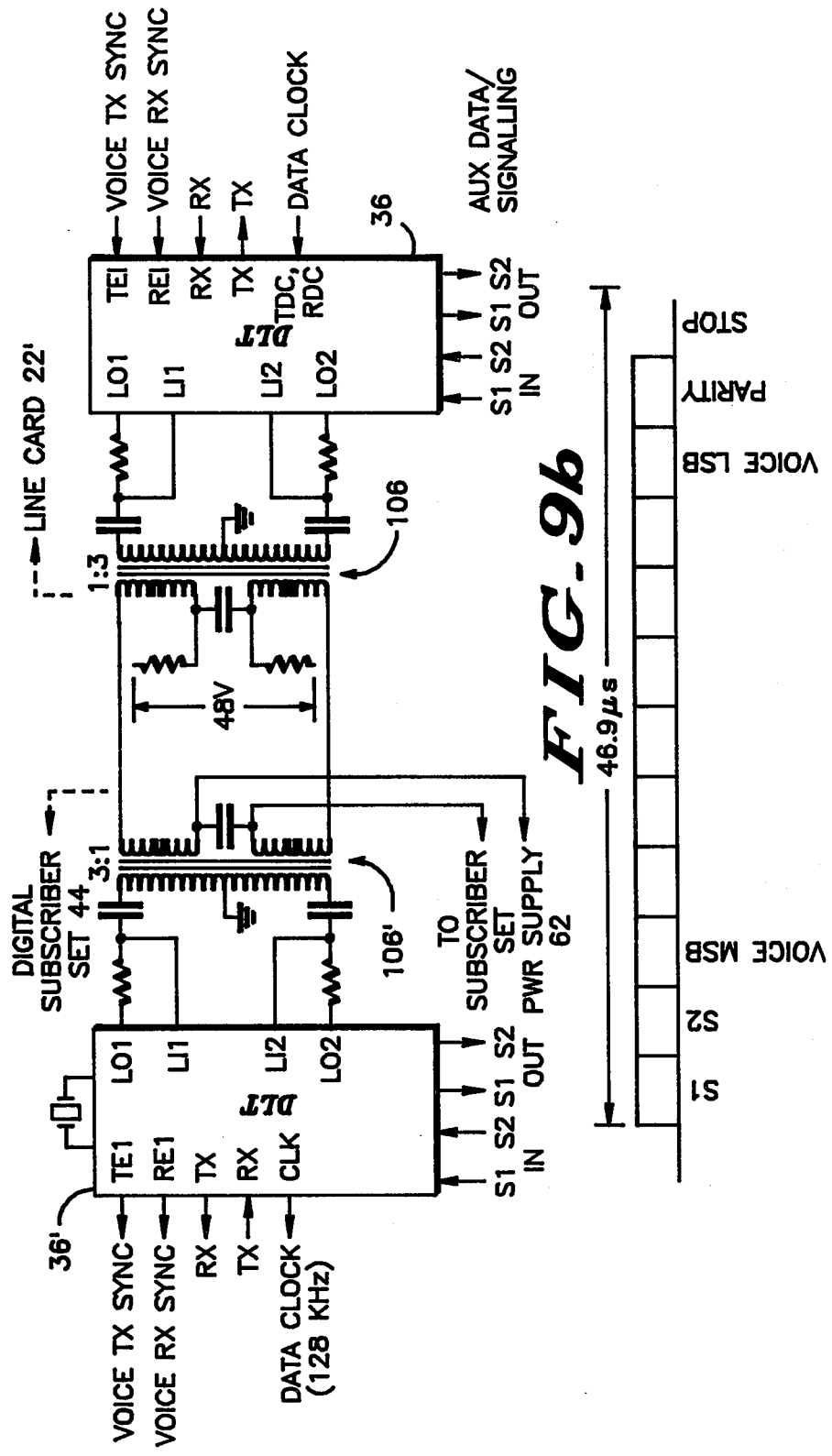
FIG. 9(a) is a schematic representation of a two-wire communication system between the DLT in the digital line card of FIG. 3 and the DLT in the digital subscriber set of FIG. 4.
FIG. 9(b) is a diagram of a data word associated with the communication system of FIG. 9(a).

Although the DLT 36 is designed to operate primarily in the dual-channel mode over a duplex subscriber line, the DLT 36 may also be operated in an exchange which has only one pair of wires in each subscriber line by applying a logic high to a format (FOR) terminal thereof. In the illustrated form of such a two-wire system shown in FIG. 9, the half duplex subscriber line is coupled at the exchange end thereof to DLT 36 in the digital line card 22' via a transmit/receive isolation transformer 106, and at the subscriber end thereof to DLT 36' in digital subscriber set 44 via a transmit/receive isolation transformer 106'. In the dual-channel form of the half duplex system, a frame of data comprises an eight bit digital data word for the first channel, the signalling bit for the first channel, and a second signalling bit for use by the subscriber data processor as a digital data bit. Preferably, the frame also includes a parity bit, either even or odd, as desired. A suitable frame format is illustrated in FIG. 9. Since only a single digital data bit may be transferred in each frame, the effective data bit transmission rate is only 8 kHz rather than the 64 kHz of the duplex system. However, this reduced data rate may be acceptable in situations where the cost to install the second pair of wires in the subscriber line outweighs the benefits of higher transmission rate.

Figure 10:
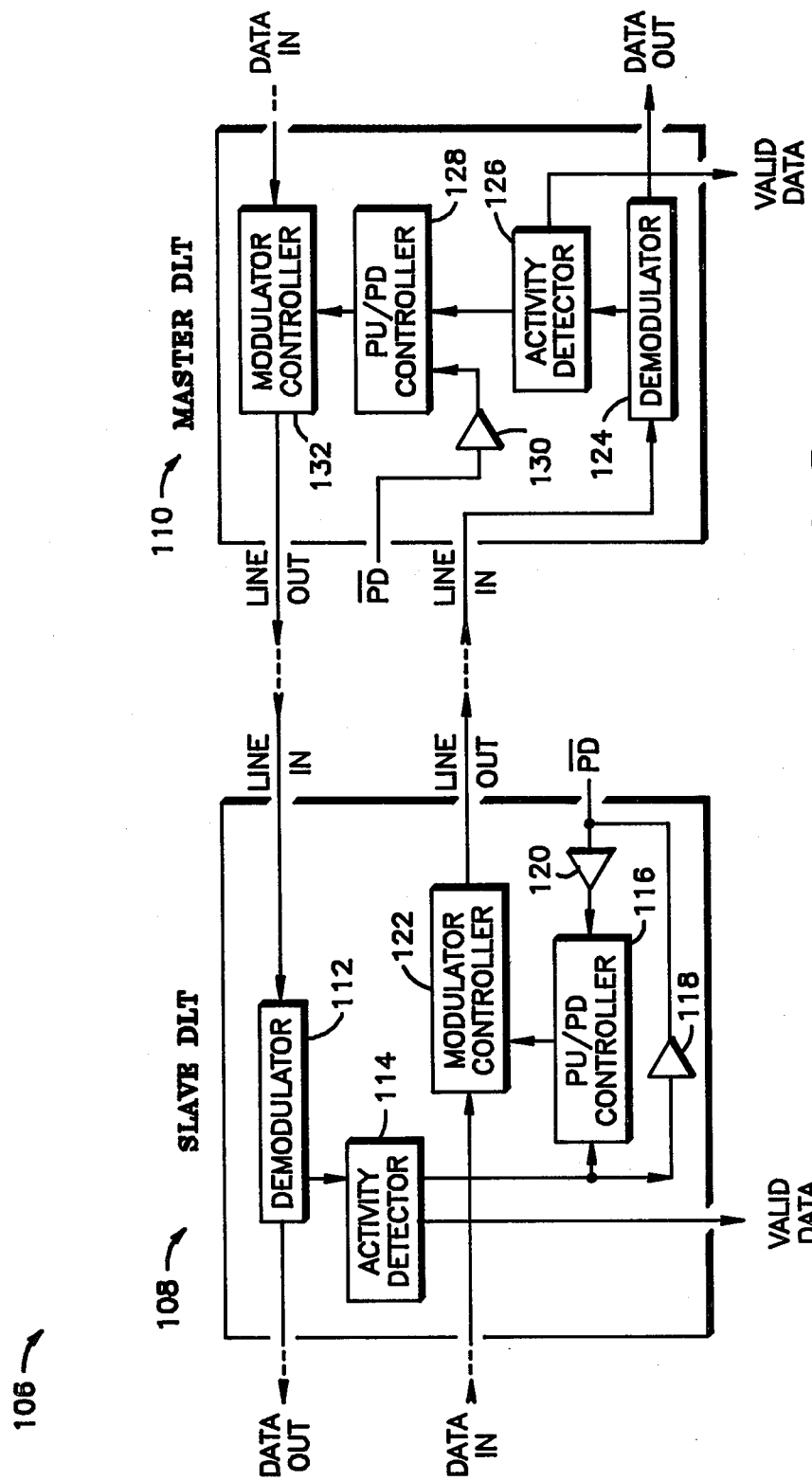
FIG. 10 is a block representation of a power up/power down circuit constructed in accordance with a preferred embodiment of the present invention for use in both a master DLT in a digital line card and a slave DLT in a digital subscriber set.

Shown in FIG. 10 is a block representation of a power up/power down circuit 106 constructed in accordance with a preferred embodiment of the present invention and having a slave DLT or slave portion 108 and a master DLT or master portion 110. The slave portion 108 typically represents a remote subscriber set or telephone and the master portion 110 typically represents a line card in a PABX. However, it should be readily understood that the invention may be practised by using power up/power down circuit 106 only in a telephone set or only in a PABX depending upon design preference.

Slave portion 108 comprises a demodulator 112 having an input coupled to a data line input and has a demodulated data output. Demodulator 112 has an activity output which is coupled to an activity detector 114 which has a first output for indicating the presence of valid demodulated data. Activity detector 114 has a second output coupled to both a first input of a power up/power down controller 116 and an input of a buffer 118. An output of buffer 118 is coupled to both an input of a buffer 120 and to an external power up terminal, $\overline{PD}$. An output of buffer 120 is coupled to a second input of power up/power down controller 116 which has an output coupled to a control terminal of a modulator controller 122. An input of modulator controller 122 is coupled to modulated data at a modulated data input. An output of modulator controller 122 is coupled to a line output terminal. The line input and line output terminals of slave portion 108 are coupled via a twisted pair of telephone wires to master portion 110 which is usually distant from slave portion 108.

In correlating FIG. 10 with the previous detailed description, demodulator 112 comprises input buffer 90, window detector 94, correlator 96, comparator 98 and part of sequencer and control portion 68 shown in FIG. 5. Activity detector 114 comprises sync detector 92 and part of sequencer and control portion 68. Power up/power down controller 116 comprises part of sequencer and control portion 68. Modulator controller 122 comprises DAC control circuit 82 and part of sequencer and control portion 68 of FIG. 5.

Master portion 110 comprises a demodulator 124 having an input coupled to a line input terminal. The line input terminal of master portion 110 is coupled to the line output terminal of slave portion 108 via one of the telephone wires forming the twisted pair. Demodulator 124 provides demodulated output data at a demodulated data output terminal and has an activity output which is coupled to an activity detector 126. Activity detector 126 has a first output for providing a valid data indication and also has a second output coupled to a first input of a power up/power down controller 128. A buffer 130 has an input coupled to an external power up terminal, $\overline{PD}$, and an output coupled to a second input of power up/power down controller 128. Power up/power down controller 128 has an output coupled to a first input of a modulator controller 132 which has modulated input data coupled to a second input. An output of modulator controller 132 is coupled to a line output terminal. The line output terminal of master portion 110 is coupled to the line input terminal of slave portion 108. The same components of FIG. 5 which were correlated with the blocks of slave portion 108 may also be correlated with corresponding blocks of master portion 110.

As previously mentioned, the DLT is an active device which is constantly looking for signalling. In contrast, a conventional telephone set is a passive device which is totally powered down unless it is taken off hook and used. Since the master and slave DLTs are constantly alert and establish communication by using a complex transmission scheme, power dissipaton is an important design consideration. When a DLT is inactive, there is no need for all the transmission circuitry of the DLT to remain powered up. Therefore, when power up/power down circuit 106 is powered down, all transmission circuitry which is not needed is turned off. Only circuitry for receiving signalling bits is powered up in both slave and master DLTs.

Although master portion 110 is somewhat similar to slave portion 108 structurally, a slight difference in the operation of each portion exists. In master portion 110, the inputs to PU/PD controller 128 originate from the $\overline{PD}$ terminal and activity detector 126. PU/PD controller 128 controls modulator controller 132 in one of two ways depending upon the activity indication provided by activity detector 126. However, if $\overline{PD}$ has a low logic level applied thereto by a call processor, modulator controller 132 is immediately disabled via PU/PD controller 128. If $\overline{PD}$ has a high logic level, ultimately master portion 110 is powered up and modulator controller 132 allows modulated data to be transmitted to slave portion 110. When master portion 110 is powered up, modulated data is transmitted to slave portion 108 every frame of an externally applied clock signal called master synchronization interval (MSI). Exactly when modulated data is transmitted after $\overline{PD}$ goes to a high logic level is determined by what activity detector 126 has been detecting. When the $\overline{PD}$ terminal goes to a high logic level, PU/PD controller 128 will wait two frames (i.e. three leading MSI clock edges) before enabling modulator controller 132 to allow data to be transmitted to slave portion 108 unless, data is currently being received from slave portion 108 and the master valid data is at a high logic level. In such a case, when data is being received from slave portion 108 and the call processor forces $\overline{PD}$ to a high logic level, PU/PD controller 128 makes master portion 110 wait until the end of the slave data reception and burst data back to slave portion 108 on the immediately following MSI leading clock edge, for every following frame until $\overline{PD}$ returns to a low logic level. The valid data signal from activity detector 126 enables the call processor to know that the line card of the PABX is receiving data bursts from slave portion 108. This informs the call processor to consider the signalling bits which are being demodulated as being correct.

In slave portion 108, initially ignore the presence of buffer 118 for the purpose of simplicity. Without buffer 118, the $\overline{PD}$ input is totally controlled externally as was the situation with master portion 110. If $\overline{PD}$ is a low logic level, PU/PD controller 116 forces modulator controller 122 to stop transmitting data to master portion 110. When $\overline{PD}$ is externally forced to a high logic level, modulator controller 122 will eventually power up depending upon the operation of activity detector 114. If there is no activity at the line input of slave portion 108, the valid data terminal of activity detector 114 is a low logic level. When no activity is indicated by detector 114, PU/PD controller 116 will cause modulator controller 122 to burst data to master portion 110 during every other frame defined by a slave clock (not shown) locally derived by a crystal (not shown) in slave portion 108. The slave clock must be within 0.25 percent of the frequency of the MSI clock for proper synchronization. Modulator controller 122 will continue bursting data to master portion 110 every other frame until either $\overline{PD}$ is brought to a low logic level or until activity detector 114 indicates a data burst from master portion 110. If a data burst is received from master portion 110, slave portion 108 returns to a normal mode of synchronization whereby slave portion 108 only transmits a burst of data to master portion 110 at the end of a received burst of data from master portion 110. The synchronization of slave portion 108 bursting data every other frame cycle when master portion 110 is idle and master portion 110 bursting data every frame when powered up insures no collisions between slave portion 108 and master portion 110 in a two-wire system.

In order to implement power up/power down circuit 106 as explained up to this point, external controller logic would be required to coordinate the powering up and down of slave portion 108. However, buffer 118 prevents the need for an external controller. Buffer 118 forces the $\overline{PD}$ terminal to a logic high level whenever activity is indicated by activity detector 114. When $\overline{PD}$ is externally unconnected from all inputs, buffer 118 will allow modulator controller 122 via PU/PD controller 116 to burst data back to master portion 110 in a ping-pong fashion upon completion of a reception of a burst of data. This synchronization works for all master originated and terminated calls and all slave terminated calls because slave portion 108 can send an on hook signal to the call processor and power down master portion 110. To permit calls to be originated at slave portion 108, an external switch may be coupled to the $\overline{PD}$ terminal which is electrically open when slave portion 108 is on hook and electrically closed and coupled to a high logic level when slave portion 108 is off hook. The on and off hook information is also put into the signalling bits. Therefore, when slave portion 108 is originating a telephone call and powering itself up, slave portion 108 enters an alternate frame data burst mode asynchronously.

Figure 11:
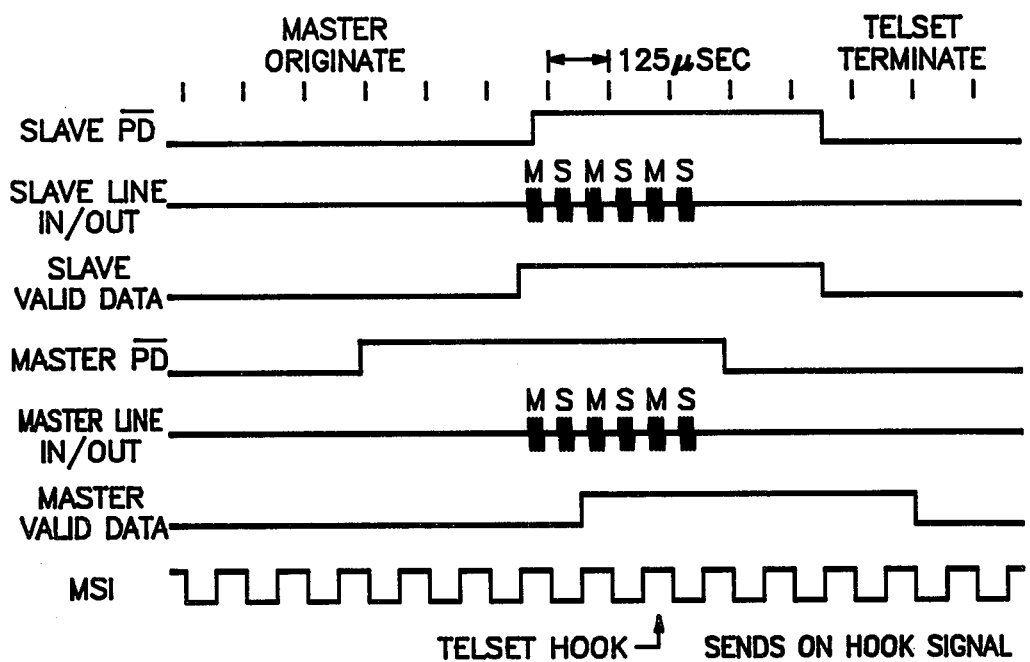
FIG. 11 is a timing diagram illustrating a typical exchange between a master DLT and a slave DLT of FIG. 10.
Figure 12:
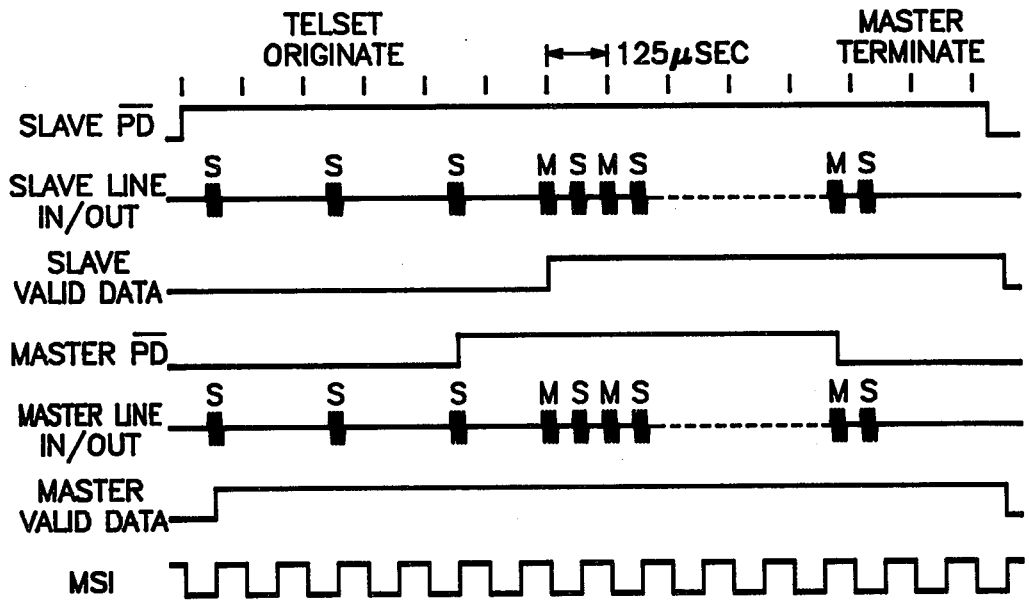
FIG. 12 is a timing diagram illustrating another exchange between a master DLT and a slave DLT of FIG. 10.

Referring to FIGS. 11 and 12, examples of slave portion 108 and master portion 110 each originating and terminating a call are shown. Initially, assume no communication is occurring between the master and slave DLTs and power up/power down circuit 106 is in a power down mode. In this mode, the receivers of both master and slave DLTs are always active and listening to detect a burst of data. Assume, for the purpose of illustration only, that the master DLT originates a burst of data to the slave DLT via the two-wire system of FIG. 10. The $\overline{PD}$ terminal of master portion 110 is brought to a high logic level by the call processor. The associated waveforms are illustrated in FIG. 11. The master synchronization interval (MSI) clock which provides synchronization for master portion 110 is also illustrated. After the master DLT's $\overline{PD}$ terminal is brought to a high logic level, the master DLT waits three leading MSI clock edges or until a burst of data is received from the slave DLT. In FIG. 11, no burst of data from the slave DLT is received because the slave DLT is powered down. On the third leading MSI clock edge (i.e. during the third frame after the frame in which the master $\overline{PD}$ terminal is brought to a high logic level), the master DLT will start bursting data to the slave DLT every frame. Demodulator 112 of slave portion 108 receives the data burst and transmits an activity signal to activity detector 114 indicating the fact that demodulator 112 is actively demodulating a data burst. Activity detector 114 provides a high logic level valid data signal to indicate that there is activity on the line and that the data was decoded properly. Activity detector 114 forces the slave $\overline{PD}$ terminal to a high logic level via buffer 118 if the $\overline{PD}$ terminal is not forced to a low logic level externally. Simultaneously, activity is indicated at the first input of PU/PD controller 116 which signals that slave portion 108 is in a ping-pong mode of operation.

Since the DLT communication system which has previously been described operates in a ping-pong or half-duplex burst mode transmission scheme, collision avoidance of data is critical. Controller 116 provides an enable signal to modulator controller 122 which bursts data to the master DLT once every frame immediately after receipt of a burst of data from the master DLT. At this point, slave portion 108 is still in an on hook status. After a data burst is transmitted back to master portion 110, the valid data terminal of master portion 110 goes to a high logic level indicating that a communication path between master portion 110 and slave portion 108 has been established and that signalling bits are correct. At this point, synchronized communication exists between master portion 110 and slave portion 108. The signalling bits still indicate to the call processor that slave portion 108 is on hook. The call processor then brings the ring signalling bit to slave portion 108 to a high logic level and the telephone set of slave portion 108 rings indicating that someone is calling. When the phone is picked up by someone, the $\overline{PD}$ terminal of slave portion 108 goes to a high logic level by an external switch. Since $\overline{PD}$ was already forced to a high logic level, PU/PD controller 116 effects no change. However, a signalling bit is sent back to the call processor which indicates that slave portion 108 went off hook and the ringing signalling bit is removed by returning the ringing bit to a low logic level.

During the communication, data bursts from both master portion 110 and slave portion 108 are synchronously ping-ponged once every 125 microseconds. Assume for the purpose of illustration only that the telephone set is the first to end communication by going on hook. The telephone set sends an on hook signalling bit to master portion 110 at the time indicated in FIG. 11. The $\overline{PD}$ terminal of slave portion 108 remains at a high logic level initially since master portion 110 is still communicating and the $\overline{PD}$ terminal is externally electrically open when slave portion 108 is on hook. Master portion 110 is powered down by the call processor by returning the $\overline{PD}$ terminal of master portion 110 to a low logic level. Immediately, master portion 110 stops bursting data. Activity detector 114 detects the end of data transmission by master portion 110 and PU/PD controller 116 powers down slave portion 108 via buffers 118 and 120 after the lapse of two hundred fifty microseconds or two frames. $\overline{PD}$ of slave portion 108 is externally floating when slave portion 108 is on hook so that slave portion 108 may be externally powered up and down via buffer 118. To accomplish power up and down of slave portion 108 via the $\overline{PD}$ terminal from an external data signal, buffer 118 is fabricated with relatively weak devices or transistors having a small channel width to length ratio.

Shown in FIG. 12 are signals associated with power up/power down circuit 108 when a call originates at a telephone set having the slave DLT. When the telephone set goes off hook and the slave $\overline{PD}$ terminal is forced externally to a high logic level, the slave DLT will start bursting data to the master DLT on every other frame at the slave DLT's own locally derived frame rate although there is no activity from master portion 110 being detected by activity detector 114. Activity detector 126 of master portion 110 detects the presence of valid data from slave portion 108. The valid data signal of master portion 110 remains at a high logic level as long as slave portion 108 transmits a burst of data every other frame. The call processor notices that the valid data signal of master portion 110 is a high logic level signal and reads the signalling bits which inform the call processor that slave portion 108 is off hook. Therefore, the call processor powers up master portion 110 by bringing the $\overline{PD}$ terminal to a high logic level. This may take any length of time due to the variable time the call processor may take. FIG. 12 illustrates approximately four and one-half frames for the master DLT to power up after the slave $\overline{PD}$ terminal goes to a high logic level. However, the master DLT may power up considerably faster or slower depending upon the call processor speed. If the master $\overline{PD}$ terminal goes to a high logic level during a burst of data from slave portion 108 as shown in FIG. 12, master portion 110 will transmit a burst of data back to slave portion on the first rising edge of the MSI signal after the data burst from slave portion 108. Since slave portion 108 only transmits data every other frame, power up/power down circuit 106 is assured that regardless of when a data burst from slave portion 108 ends with respect to the MSI signal, master portion 110 will transmit data on the next MSI leading edge to slave portion 108 before slave portion 108 will burst back. Master portion 110 synchronously bursts data to slave portion 108 every frame after the $\overline{PD}$ terminal of master portion 110 goes to a high logic level. Activity detector 114 transitions slave portion 108 to a ping-pong mode via PU/PD controller 116 in synchronization with the MSI clock of master portion 110.

In operation, if a caller at the distant end of the communication channel from slave portion 108 ends the conversation first by going on hook, the call processor powers down master portion 110 by forcing the $\overline{PD}$ terminal to a low logic level. No more data bursts are transmitted from master portion 110 after the PD terminal is forced low. Although activity detector 114 of slave portion 108 is no longer sending a detect signal to PU/PD controller 116 via buffers 118 and 120, the PD terminal of slave portion 108 remains at a high logic level by the call processor until slave portion 108 goes on hook. The call processor induces slave portion 108 to go on hook by transmitting a warning signal via the two-wire pair until slave portion 108 goes on hook and the slave $\overline{PD}$ terminal returns to a low logic level. The warning signal typically is a loud PCM encoded tone which is produced by codec/filter 32' of the subscriber telephone set.

In operation, the only way a collision of data bursts between the master DLT and the slave DLT may occur is when both the master and slave DLTs power up at exactly the right time. Even if this happens, only one collision of data will occur because the slave DLT will not recognize the incoming data as a received signal. The slave DLT will then get another burst of data before the slave DLT will burst any more data back because the slave DLT appears to only be powered up and not yet synchronized.

Complete control of the telephone set is attainable with this scheme and no microprocessor is required. The circuitry consists basically of an activity monitor and the protocol of waiting at the master DLT until a burst of data is received or until three edges of MSI elapse before bursting data in return. The master DLT always bursts every frame. The slave DLT will either burst in response to the master DLT or will burst every other frame if no activity is occurring from the master DLT. As soon as the slave DLT gets a burst from the master DLT, the slave DLT will always synch up. The basic reason why there is a hold when the slave DLT is powering up in the absence of a burst from the master DLT means that the slave DLT is either initiating a call or is holding on after the master DLT has powered down. This allows the slave DLT to synch up without any collision. Further, the probability of both the telephone office initiating a call and a subscriber set going off hook at the same time is extremely minute for 125 microsecond frame length. In conventional analog systems employing relays, the probability of both the telephone office and a subcriber set initiating a call simultaneously is much larger since the analog system is mechanical.

By now it should be apparent that the slave DLT has the ability to self power up and down via power up/power down circuit 106. Further, the ability to power up or down slave DLT portion 108 may be overridden externally to initiate a call from the slave DLT. Basically, power consumption at the slave DLT is controlled by whether or not the master DLT is active. Power up/power down circuit 106 may be used in any duplex communication system employing a half duplex burst mode.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

We claim:

1. A power up/power down circuit for powering up and powering down a first digital transceiver coupled to a second digital transceiver in a data burst mode full duplex communication system, the first and second digital transceivers bursting data at first and second frame rates, respectively, comprising:
   detection means having an input coupled to a communication line input terminal, and an output, for providing a detect signal in response to the presence of data bursts at the line input terminal;
   power control means having a first input coupled to the output of said detection means, a second input coupled to a power enable terminal capable of receiving a power enable signal, and an output, for powering up and powering down said first digital transceiver in response to said detect and power enable signals; and
   data control means having a control input coupled to the output of said power control means, and an output coupled to a communication line output terminal, for transmitting a power up data burst at the first frame rate via a two-wire pair of conductors to said second digital transceiver in response to said power enable signal until receipt by the first digital transceiver of a first data burst from the second digital transceiver in response thereto, said power up data bursts, if more than one, being transmitted every other frame to avoid collision with the first data burst transmitted by the second digital transceiver, and for synchronously transmitting at least one data burst to the second digital transceiver at the second frame rate every data frame in response to both said power enable and detect signals, thereby establishing synchronous transmission and reception of data between the first and second digital transceivers.

2. The power up/power down circuit of claim 1 wherein said first and second frame rates are the same frame rates.

3. The power up/power down circuit of claim 1 wherein said power control means further comprise:
   a first buffer having an input coupled to said power enable terminal, and an output coupled to the second input of said power control means; and
   a second buffer having an input coupled to both the output of said detection means and the first input of said power control means, and an output coupled to the input of said first buffer, for allowing said data control means to transmit data bursts at said second frame rate in response to only said detect signal.

4. The power up/power down circuit of claim 3 further comprising processing means for providing said power inable signal, thereby initiating data transmission at said first frame rate.

5. A method of powering up and powering down a first digital transceiver coupled to a second digital transceiver in a data burst mode full duplex communication system, comprising the steps of:
   providing a power enable signal for indicating that the first digital transceiver is powered up and the second digital transceiver needs to be powered up;
   transmitting, in response to the power enable signal, a burst of data at a first data frame rate from the first digital transceiver to the second digital transceiver until receipt of a burst of data from the second digital transceiver is detected by said first digital transceiver; and
   transmitting synchronously a burst of data from the first digital transceiver to the second digital transceiver at a second data frame rate and immediately after receipt of a burst of data from the second digital transceiver to the first digital transceiver, thereby establishing synchronous communication between said first and second digital transceivers.

6. A power up/power down circuit for powering up and powering down a digital transceiver in a data burst mode full duplex communication system, comprising:
   detection means having an input coupled to a communication line input terminal, and an output, for providing a detect signal in response to the presence of data bursts at the line input terminal;
   power control means having a first input coupled to the output of said detection means, a second input coupled to a power enable terminal capable of receiving a power enable signal, and an output, for powering up and powering down said digital transceiver in response to said detect and power enable signals; and
   data control means having a control input coupled to the output of said power control means, and an output coupled to a communication line output terminal, for transmitting data bursts via a two-wire pair of conductors in response to said power enable signal at a first data frame rate until receipt of an incoming burst of data, and for transmitting data bursts at a second data frame rate thereafter and in response to both the power enable and detect signals.

7. In a data burst mode full duplex communication system having an automatic branch exchange using a first digital transceiver and a subscriber set using a second digital transceiver, a circuit for asynchronously powering up and powering down said first and second digital transceivers to establish synchronous communication via a two-wire pair of conductors, comprising:

a master portion located at said automatic branch exchange for powering up and down said first digital transceiver, comprising:

master detection means having an input coupled to a master line input terminal, and an output, for providing a master detect signal in response to the presence of data burst at the master line input terminal;

a master buffer having an input coupled to a master power enable terminal, and an output for providing a master power enable signal;

master power control means having a control input coupled to the output of said master power control means, and an output coupled to a master communication line output terminal, for synchronously transmitting data bursts via said two-wire pair of conductors at a master data rate in response to either said power enable signal or said detect signal; and a slave portion located at said subscriber set for powering up and down said second digital transceiver, comprising:

slave detection means having an input coupled to a slave line input terminal, and an output, for providing a slave detect signal in response to the presence of data bursts at the slave line input terminal;

a first slave buffer having an input coupled to the output of said slave detection means, and an output coupled to a slave power enable terminal, said enable terminal being capable of receiving a slave power enable signal;

a second slave buffer having an input coupled to said slave power enable terminal, and an output, for providing said slave power enable signal;

slave power control means having an input coupled to the output of said slave detection means, a second input coupled to the output of secdon slave buffer, and an output, for powering up and down said second digital transceiver in response to said slave detect and power enable signals; and slave data control means having a control input coupled to the output of said slave power control means, and an output coupled to a slave communication line output terminal, for transmitting a power up data burst via the two-wire pair of conductors at a first slave data rate in response to said slave power enable signal until receipt of a first data burst from the first digital transceiver, and for transmitting data bursts at a second slave data rate in response to both said slave power enable and detect signals, thereby avoiding collisions with data bursts received from said master portion via the two-wire pair.

8. The communication system of claim 7 further comprising a plurality of slave portions, each slave portion having a digital transceiver and a circuit for powering up and down the digital transceiver coupled to said master portion via said two-wire pair of conductors, for synchronous transmission and reception of data bursts.

* * * * *